US 6,734,978 B2

(12) United States Patent
Adachi

(10) Patent No.: US 6,734,978 B2
(45) Date of Patent: May 11, 2004

(54) PROFILE MEASURING METHOD AND MEASUREMENT APPARATUS USING INTERFERENCE OF LIGHT

(75) Inventor: Masaaki Adachi, Kanazawa (JP)

(73) Assignee: President of Kanazawa University, Kanazawa (JP)

( * ) Notice: Subject to any disclaimer, the term of this patent is extended or adjusted under 35 U.S.C. 154(b) by 98 days.

(21) Appl. No.: 10/085,082

(22) Filed: Mar. 1, 2002

(65) Prior Publication Data

US 2003/0053076 A1 Mar. 20, 2003

(30) Foreign Application Priority Data

Sep. 4, 2001 (JP) ........................................ 2001-267786

(51) Int. Cl.[7] .............................................. G01B 9/02
(52) U.S. Cl. ...................................... 356/512; 356/497
(58) Field of Search ................................ 356/479, 486, 356/489, 497, 498, 500, 511, 512, 513, 514

(56) References Cited

U.S. PATENT DOCUMENTS

| 4,832,489 A | * | 5/1989 | Wyant et al. ................ 356/513 |
| 5,042,949 A | * | 8/1991 | Greenberg et al. ........... 356/451 |
| 5,706,085 A | * | 1/1998 | Blossey et al. .............. 356/512 |

OTHER PUBLICATIONS

Akiko Harasaki, et al., "Improved Vertical–Scanning Interferometry", Applied Optics, vol. 39, No. 13, May 1, 2000, pp. 2107–2115.

Leslie Deck, et al., "High–Speed Noncontact Profiler Based on Scanning White–Light Interferometry", Applied Optics, vol. 33, No. 31, Nov. 1, 1994, pp. 7334–7339.

Yeou–Yen Cheng, et al., "Two–Wavelength Phase Shifting Interferometry", Applied Optics, vol. 23, No. 24, Dec. 15, 1984, pp. 4539–4543.

Byron S. Lee, et al., "Profilometry with a Coherence Scanning Microscope", Applied Optics, vol. 29, No. 26, Sep. 10, 1990, pp. 3784–3788.

Masaaki Adachi, et al., "How to Attain High–Speed Scanning in a Vertical Scan Type White Light Interference Method", a treatise collection distributed at a meeting of the Japan Association for Precision Engineering, Mar. 5, 2001.

* cited by examiner

Primary Examiner—Samuel A. Turner
Assistant Examiner—Michael A. Lyons
(74) Attorney, Agent, or Firm—Oblon, Spivak, McClelland, Maier & Neustadt, P.C.

(57) ABSTRACT

A profile measurement apparatus of the present invention is characterized in that two flash light beams, having wavelengths slightly different from each other, are emitted to an object with a predetermined interval $t_1$ therebetween, and when a camera picks up interference light formed by light beams reflected from the object and a light beam reflected from the reference mirror, while moving the object in a direction, in which the two flash light beams are directed, in units of intervals $t_2$ at which each of the two flash light beams is cyclically emitted, a phase shift amount corresponding to a movement amount of the object at a time is set to a value falling within a range of $2n\pi\pm\pi/2\pm\pi/4$.

15 Claims, 6 Drawing Sheets

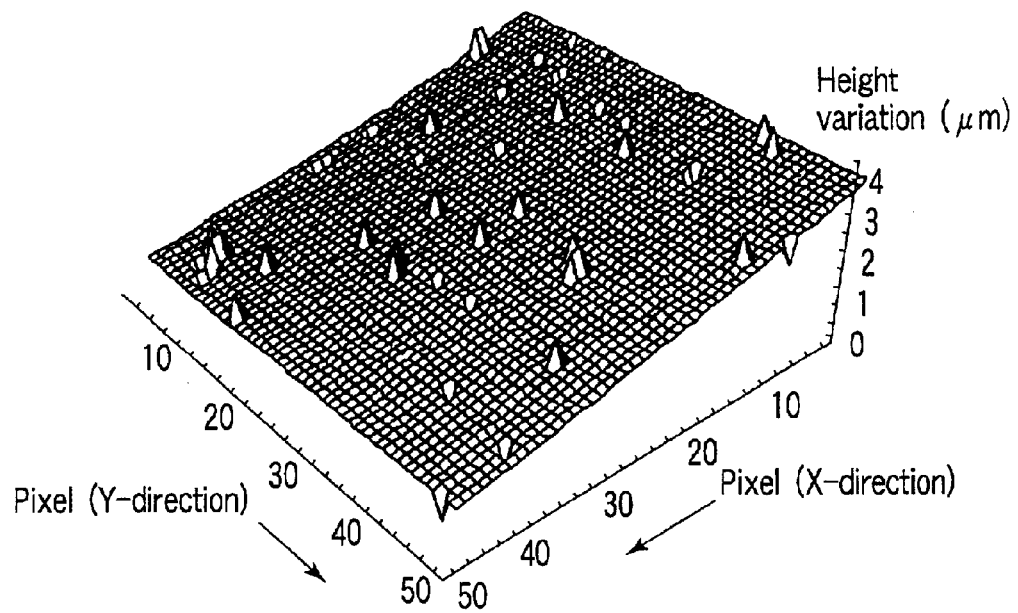
F I G. 11
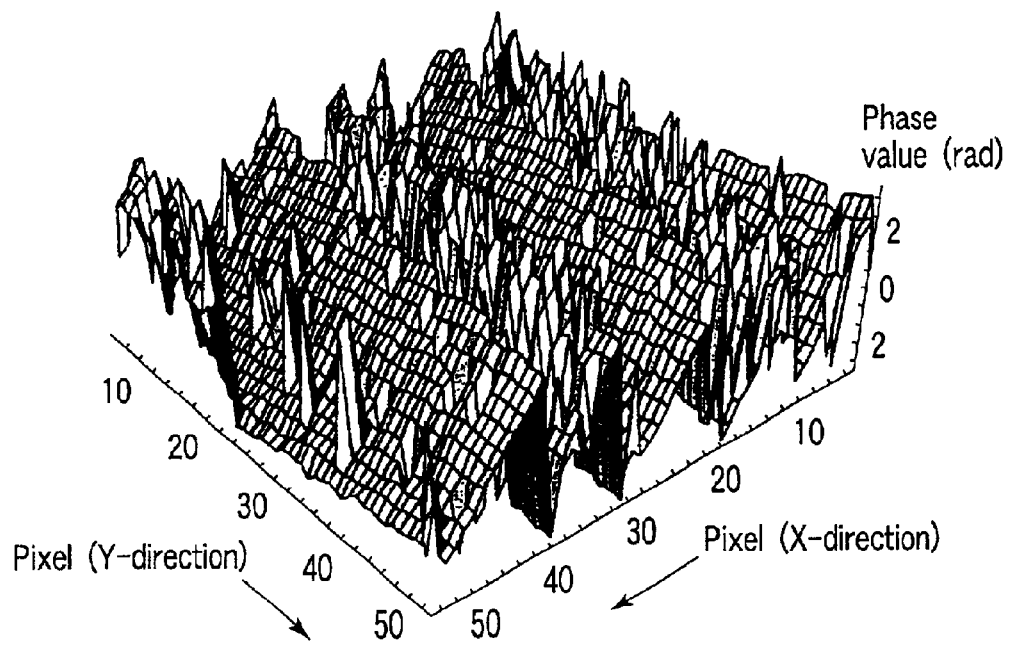
F I G. 12

PROFILE MEASURING METHOD AND MEASUREMENT APPARATUS USING INTERFERENCE OF LIGHT

CROSS-REFERENCE TO RELATED APPLICATIONS

This application is based upon and claims the benefit of priority from the prior Japanese Patent Application No. 2001-267786, filed Sep. 4, 2001, the entire contents of which are incorporated herein by reference.

BACKGROUND OF THE INVENTION

1. Field of the Invention

The present invention relates to a profile measuring method and apparatus for use in the field of manufacturing of an ultra high degree precision machine components, the field of managing their quality and/or the field of measuring them, the surface profile of a preformed product, such as a magnetic recording component and an LSI substrate, or a liquid crystal substrate for computers, the method and apparatus capable of accurately measuring, by uses of the interference of light, with the ultra high degree precision ranging from several nanometers to several hundreds of micrometers.

2. Description of the Related Art

Techniques for measuring the shapes, in particular, surface profiles of industrial products, are important industrial techniques, and profile measurement apparatuses employing various measuring methods are now being used. In particular, profile measurement apparatuses use of the interference of light capable of non-contact measurements are widely used. However, most apparatuses of this type are not made in JAPAN.

In general, the profile measuring methods by uses of the interference of light, white light is applied to the surface of a sample through a band-pass filter, interference light formed by light reflected from the surface of a sample and light reflected from a reference surface (a reference mirror) is picked up by a camera, and an image output from the camera is subjected to image processing (the image output is analyzed). In the profile measuring methods for acquiring interference light include, for example, the phase shift method or multipoint simultaneous pickup method. The phase shift method include various types of making an optical-path difference for the acquisition of interference light. Further, there are various types of output image processing methods.

Wyco Corporation (USA), for example, provides a profile measurement apparatus in which an interference phase is obtained for a smooth surface having an unevenness of about several microns, using the phase shift method that employs a shift amount of $\pi/2$, while the profile of a surface having a greater unevenness is obtained from the peak position of an envelope indicative of variations in the sine wave of an interference signal appearing when an optical-path difference is changed.

In the Wyco profile measurement apparatus, to enable both a smooth surface and a rough surface to be measured, phase shifting is executed in units of less than $\pi$, such as $\pi/2$ or $\pi/3$. A number of interference images are picked up by a two-dimensional camera, and phase data of each pixel of the camera is obtained from a signal output from the camera, using the phase shift algorithm. Further, the envelope of variations in the sine wave of an interference signal is extracted from the signal, thereby calculating the profile of the surface.

Zygo corporation (USA) provides a measurement apparatus for picking up an interference image using a shift amount of $\pi/2$, and simultaneously extracting interference contrast data and phase data, using a data analysis in frequency domain.

In the Zygo profile measurement apparatus and method, it is not necessary to measure the peak position of an envelope for each pixel, and both a smooth surface and a relatively rough surface with a step can be measured using the same data processing method. Further, this method incorporates a technique for minimizing the required memory capacity.

In addition to the above-described two measuring apparatuses, a further method has been proposed. In this method, the shape of an envelope of variations in the sine wave of an interference signal, which appears when an optical-path difference is changed, is estimated from a small number of sampling points (in terms of an amount of shift (shift amount) in the phase shift method, image pickup is executed in units of about $10\pi$) using a band-pass type sampling theorem, thereby extracting the peak position and obtaining a surface profile.

Moreover, a method for increasing measurement speed has been proposed, which employs multipoint simultaneous image pickup using a confocal microscope effect and a microlens array (Journal of the Japan Society for Precision Engineering, Vol. 64, No. 7, pp 1022 to 1028, 1998).

In the case of using light interference based on light of a wavelength $\lambda$, if an optical-path difference is differed with $\lambda \times n'$ (n' is an integer), the intensity of interference light is substantially identical for different values of n', and hence the optical difference cannot be correctly determined. Accordingly, a sample that has a rough surface with discontinuous surface level variations cannot be measured simply by a method for obtaining a phase value.

In the aforementioned Wyco profile measurement apparatus, phase shifting is executed in units of less than $\pi$, such as $\pi/2$ or $\pi/3$, and a number of light interference images are picked up by a two-dimensional camera. In this case, usually, about $\frac{1}{30}$ second is required to transfer data corresponding to one image from the camera to a computer, and the speed, at which the optical-path difference of the interferometer is changed, is set to, at maximum, $(\lambda/4)/(\frac{1}{30}\text{ sec.})$. In other words, if a phase shift amount is just $\pi/2$, the image pickup operation must be executed four times in order to change the optical-path difference by one wavelength. This means that the interferometer is of a reflection type, and the movement speed of an incorporated movable table is about 2.0 $\mu$m/sec., and much time is required for measuring a rough surface.

In this measuring method, even if a high-speed camera is used to increase the transfer rate of image data, much time is required for data processing since the amount of image data itself cannot be reduced, thereby making it difficult to considerably increase the measurement speed.

Furthermore, in the Zygo measuring method and measurement apparatus, a phase shift amount employed in its three-dimensional profile measuring method is about $\pi/2$, as in the Wyco apparatus, and hence it is difficult to significantly increase the measurement speed.

On the other hand, in the method in which the shape of an envelope of variations in the sine wave of an interference signal, which appears when an optical-path difference is changed, is estimated from a small number of sampling points (in terms of a shift amount in the phase shift method, image pickup is executed in units of about $10\pi$), using a band-pass type sampling theorem, thereby extracting the peak position and obtaining a surface profile, the time required for measurement can be shortened (the measurement speed can be increased), but the measurement precision is about 1/10 to 1/100 of that of the phase shift method.

The other method, which employs multipoint simultaneous image pickup using a confocal microscope effect and a microlens array, merely provides a measurement precision as low as that obtained by a microscope using confocal focusing (confocal microscope).

BRIEF SUMMARY OF THE INVENTION

It is the object of the invention to provide a profile measurement apparatus and method for measuring, at high speed and in a non-contact manner, the surface profile of a to-be-measured object with a precision as high as that of the phase shift method.

According to an aspect of the present invention, there is provided a profile measuring method of calculating, using a phase shift method, a phase value of an interference image formed by a light beam reflected from an object and a light beam reflected from a reference mirror, thereby obtaining an optical path difference from the calculated phase value and obtaining a profile of the object from the optical path difference, comprising: emitting, to the object, two flash light beams, having wavelengths slightly different from each other, with a predetermined interval $t_1$ therebetween; and picking up, using a camera, interference light formed by light beams reflected from the object and a light beam reflected from the reference mirror, while moving the object in a direction, in which the two flash light beams are directed, in units of intervals $t_2$ at which each of the two flash light beams is cyclically emitted, a phase shift amount corresponding to a movement amount of the object at a time being set to a value falling within a range of $2n\pi \pm \pi/2 \pm \pi/4$.

According to an other aspect of the present invention, there is provided a profile measurement apparatus comprising: a first flash light source which emits a flash light beam of a first wavelength; a second flash light source which emits a flash light beam of a second wavelength, different from the first wavelength, with an interval $t_1$ from the light beam of the first wavelength; a movement table which moves an object in a direction in which the flash light beams from the first and second flash light sources are directed to the object; a translucent mirror which diverges, to a reference mirror, part of the two flash light beams emitted from the first and second flash light sources and directed to the object, the translucent mirror returning, to an original route, light reflected from the reference mirror; a camera which picks up, as an image, interference light formed by light reflected from the object and light reflected from the reference mirror; a table control section which moves the movement table by a predetermined distance in synchronism with an interval $t_2$ between successive emissions of light from the first and second flash light sources; and an image processing unit which selects an image signal with a maximum amplitude from a plurality of images output from the camera when the movement table has been moved by the predetermined distance in synchronism with the interval $t_2$, thereby determining an optical path difference on the basis of a phase difference between two interference images created by the two flash light beams emitted from the first and second flash light sources when the camera has picked up the image signal with the maximum amplitude, and also on the basis of phase values of the interference images assumed when the camera has picked up the image signal with the maximum amplitude.

According to a still other aspect of the present invention, there is provided a profile measurement apparatus comprising: a first flash light source which emits a flash light beam of a first wavelength; a second flash light source which emits a flash light beam of a second wavelength, different from the first wavelength, with an interval $t_1$ from the light beam of the first wavelength; a movement table which moves an object in a direction in which the flash light beams from the first and second flash light sources are directed to the object; a translucent mirror which diverges, to a reference mirror, part of the two flash light beams emitted from the first and second flash light sources and directed to the object, the translucent mirror returning, to an original optical path, light reflected from the reference mirror; a camera which picks up, as an image, interference light formed by light reflected from the object and light reflected from the reference mirror; a table control section which moves the movement table by a predetermined distance in synchronism with an interval $t_2$ between successive emissions of light from the first and second flash light sources; and an image processing unit which selects an image with a maximum amplitude from a plurality of images output from the camera each time the first and second flash light sources emit their respective light beams with the interval $t_1$ interposed therebetween, and also each time the movement table is moved by the predetermined distance in synchronism with the interval $t_2$, the image processing unit then calculating an optical path difference from two interference images formed by the two light beams emitted from the first and second flash light sources and reflected from a surface of the object, the image processing unit calculating respective optical path differences at the points, thereby determining a surface profile of the object on the basis of phase values of the two flash light beams emitted from the first and second flash light sources when the camera has picked up an image signal with a maximum amplitude from the output images at each of the points of the to-be-measured area of the object.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 11 is a schematic view useful in explaining a final three-dimensional profile calculated from the image number k shown in FIG. 9, the optical path difference shown in FIG. 10, and the movement amount of the X-Y table (this smooth figure indicates that the method can measure correctly surface profiles of the object involving a step, since data correction is not executed in the X or Y directions); and FIG. 12 is a schematic view useful in explaining a surface profile obtained only using the known phase shift method.

DETAILED DESCRIPTION OF THE INVENTION

The embodiment of the invention will be described in detail with reference to the accompanying drawings.

Figure 1:
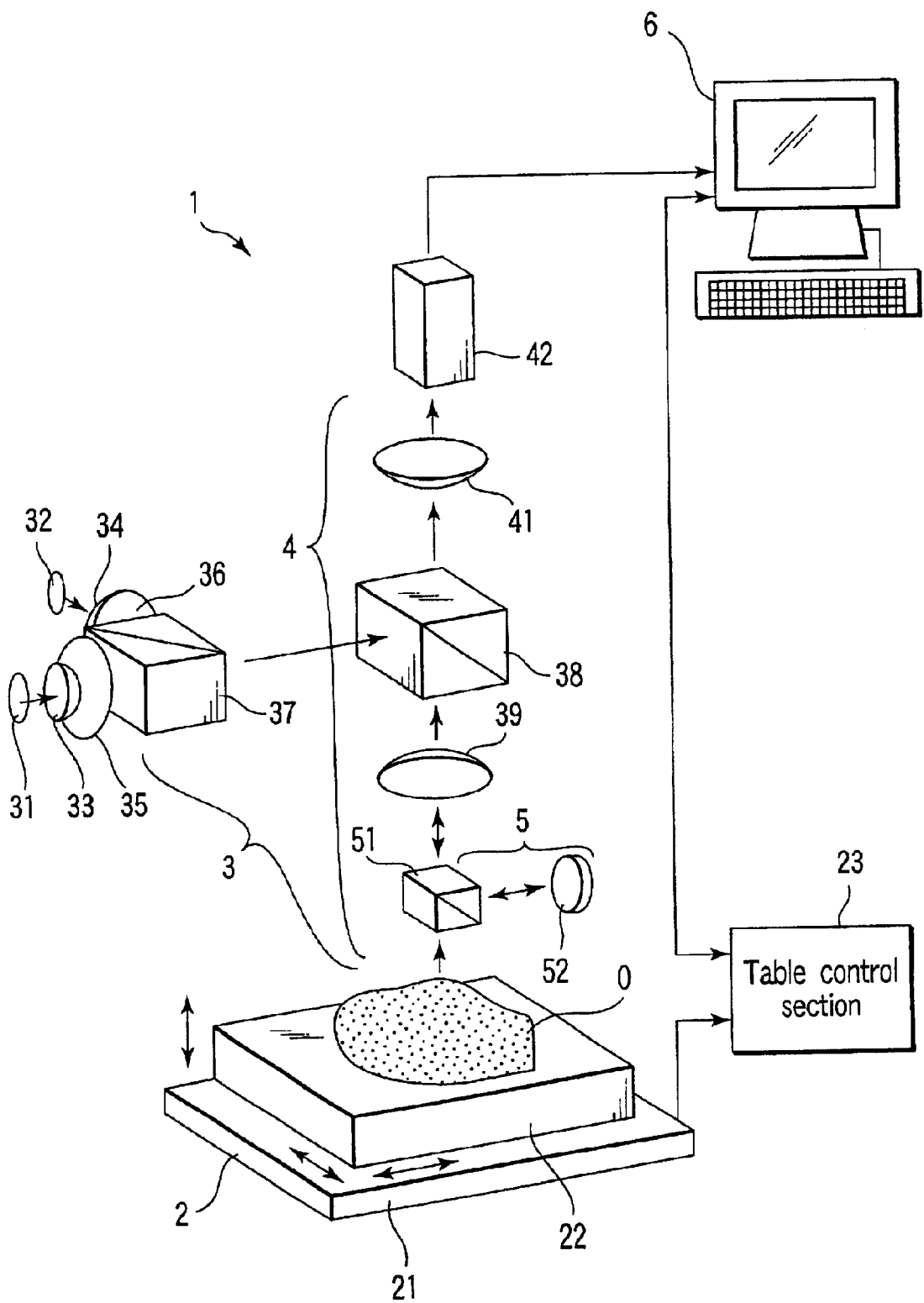
FIG. 1 is a schematic view illustrating an example of a structure of a profile measurement apparatus according to the embodiment of the invention.

As shown in FIG. 1, a profile measurement apparatus 1 includes a to-be-measured object retaining section 2 for retaining a sample, i.e. a to-be-measured object O; a light transmitting system 3 for emitting light of predetermined wavelengths to the object retaining section 2; a light receiving system 4 for receiving light (interference light) reflected from the object retaining section 2; an interference section 5 interposed between the light transmitting and receiving systems 3 and 4 and functioning as a known interferometer; and an image processing unit 6 for processing an image signal output from the light receiving system 4 and outputting a measurement result indicative of the surface profile of the object.

The object retaining section 2 includes an X-Y table 21 for moving a sample or object O in two directions (X-axis and Y-axis directions) perpendicular to each other; a vertical movement mechanism 22 for moving the X-Y table 21 in a Z-axis direction (vertical direction) perpendicular to the X-axis and Y-axis directions; and a table control section 23 for causing the Z-directional movement of the vertical movement mechanism 22 to be kept at a constant speed. The image processing unit 6 can control the table control section 23. The table control section 23 may be integrated with the image processing unit 6. Further, if a to-be-measured portion of the object O can be set, the X-Y table 21 may be moved manually in the X- and/or Y-direction.

The light transmitting system 3 includes first and second flash lamps 31 and 32 for substantially simultaneously emitting white light beams or light beams of predetermined wavelengths (actually with a predetermined slight interval $t_1$ interposed therebetween, which will be explained in more detail with reference to FIG. 2); first and second collimator lenses 33 and 34 for converting light beams, emitted from the flash lamps 31 and 32, into parallel light beams, respectively; a first band-pass filter 35 for passing therethrough a light component of a first wavelength $\lambda_1$ contained in the parallel light beam passing through the first collimator lens 33; a second band-pass filter 36 for passing therethrough a light component of a second wavelength $\lambda_2$ slightly different from the first wavelength $\lambda_1$ and contained in the parallel light beam passing through the second collimator lens 34; a first translucent mirror 37 for synthesizing the two light components of the first and second wavelengths $\lambda_1$ and $\lambda_2$ respectively passing through the band-pass filters 35 and 36; a second translucent mirror 38 for guiding the light, synthesized by the first translucent mirror 37, toward the object O placed on the object retaining section 2; and an objective lens 39 for imparting predetermined convergence to the light guided through the second translucent mirror 38, thereby converging it onto the object O. The wavelengths of the light are $\lambda_1$=540 nm and $\lambda_2$=575 nm. The two flash lamps 31 and 32 are, for example, Xe (xenon) lamps.

The light receiving system 4 includes a relay lens 41 for imparting a predetermined image-forming characteristic to the light (interference light) reflecting from the object O and passing through the objective lens 39 of the light transmitting system 3; and a camera 42 for picking up the interference light (reflected light) with the predetermined image-forming characteristic supplied by the relay lens 41.

The light reflected from the object O and returned to the objective lens 39 is separated, by the second translucent mirror 38 of the light transmitting system 3, from the light of the wavelengths $\lambda_1$ and $\lambda_2$ emitted from the first and second flash lamps 31 and 32 to the object O.

The camera 42 is not limited to any special one. It is sufficient if the camera 42 has a high-speed double exposure function that enables the camera to simultaneously pick up two interference images formed with a slight interval of about 1 msec., at maximum, more preferably, 200 nsec. to 50 microsec., and most preferably, 10 microsec. For example, a high-speed image measurement camera (C7300-10-12NRP) produced by Hamamatsu Photonics Corporation can be used as the camera 42.

The interference section 5 forms a known interferometer, and includes a third translucent mirror 51 interposed between the second translucent mirror 38 and the object O for separating part of light directed from the second translucent mirror 38 to the object O; and a reference mirror 52 located at a position at which the distance of the mirror 52 to the translucent mirror 51 is identical to or close to the distance between the object O and third translucent mirror 51 (or second translucent mirror 38). The interference section 5 causes the light beams of the wavelengths $\lambda_1$ and $\lambda_2$ reflected from the object O to interfere with each other to provide light that contains surface profile features of the object O.

The image processing unit 6 is formed of, for example, a personal computer, and is configured to process, according to a predetermined rule, an image signal corresponding to light reflected from the object O, i.e., interference light, picked up by the camera 42, thereby analyzing or patterning it. If an image signal output from the camera 42 is an analog signal, an A/D converter (not shown) or predetermined image processing software may be used.

Although in the above-described configuration, two light beams from the light transmission system 3 are deflected by the second translucent mirror 38, and light reflected from the object O (interference light) is guided to the camera 42 via the second translucent mirror 38, the optical elements, two flash lamps and camera, may be located at any position, as long as the flash lamps can emit two light beams to the object O and the camera can receive interference light formed by the light reflected from the object O and the light reflected from the reference mirror 52.

A description will be given of an example of a procedure for measurement the surface profile of the object O, using the profile measurement apparatus 1.

First, the object O is fixed on the X-Y table 21. The X-Y table 21 and vertical movement mechanism 22 are moved by respective predetermined amounts to set the object O so that the distance between the to-be-measured portion (range) of the object O and the third translucent mirror 51 is substantially identical to the distance between the reference mirror 52 and third translucent mirror 51 (second translucent mirror 38). In other words, the distance between a substantially central portion of the thickness of the object O and the mirror 51 is set identical to the latter distance.

Figure 2:
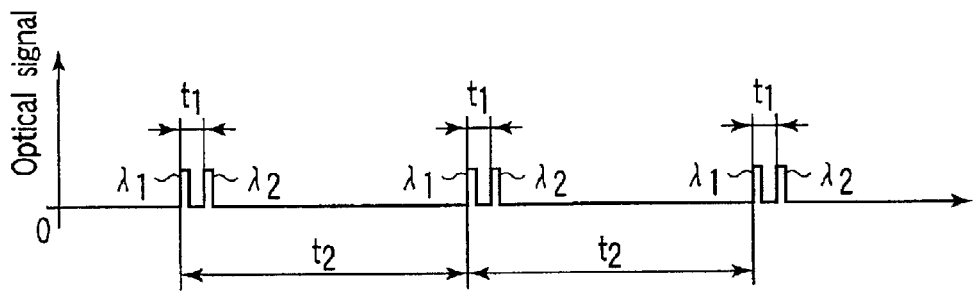
FIG. 2 is a schematic view useful in explaining the interval $t_1$ between adjacent light beams of wavelengths $\lambda_1$ and $\lambda_2$ emitted from two light sources incorporated in the profile measurement apparatus of FIG. 1, and the interval $t_2$ between the light beams with the wavelength $\lambda_1$ (or $\lambda_2$)

Subsequently, the first and second flash lamps 31 and 32 are made to substantially simultaneously emit light beams as shown in FIG. 2 (for example, they emit their respective light beams with a slight interval $t_1$ of about 1 msec., at maximum, preferably, 200 nsec. to 50 microsec., and more preferably, 10 microsec.). These beams are converted by the collimator lenses 33 and 34 into parallel light beams, and then, light beams of the wavelengths $\lambda_1$ and $\lambda_2$ are formed via the band-pass filters 35 and 36. These beams are synthesized by the first translucent mirror 37 (instant illumination light of two wavelengths ($\lambda_1$ and $\lambda_2$) is formed).

This light ($\lambda_1$ and $\lambda_2$) is deflected by the second translucent mirror 38 by substantially 90°, and converged by the objective lens 39 onto the object O fixed on the X-Y table 21. Part of the light deflected by the second translucent mirror 38 and directed to the object O is reflected by the third translucent mirror 51 to the reference mirror 52.

The X-Y table 21 retaining the object O thereon is vertically moved at a predetermined speed (which corresponds to an interval $t_2$ between successive emissions of light from the first and second flash lamps 31 and 32) by vertically moving the vertical movement mechanism 22 under the control of the image processing unit 6 in synchronism with the emission interval $t_2$ of each flash lamp.

The light reflected from the object O is directed to the camera 42. At the third translucent mirror 51, the light reflected from the object O and the light reflected and returned from the reference mirror 52 are synthesized into interference light.

The interference light formed by the light reflected from the object O and the light reflected from the reference mirror 52 passes through the second translucent mirror 38 and is converged by the relay lens 41 onto the light receiving surface (not shown) of the two-dimensional camera 42 that can record each intensity-distribution image of interference light formed by light beams of different wavelengths, in a time series manner in relation to a corresponding wavelength.

The interference light converged on the light receiving surface of the camera 42 is subjected to photoelectric conversion and then supplied to the image processing unit 6. At this time, the camera 42 outputs a plurality of images in accordance with the movement of the movement table 21 executed in the direction of the flash light for the predetermined interval $t_2$. Each image includes two different images formed by light of the wavelengths $\lambda_1$ and $\lambda_2$.

The intensity of interference light varies in accordance with the movement of the X-Y table 21 moved by the vertical movement mechanism 22 at a predetermined speed. The variations of the light intensity indicate the surface profile features of the object. Accordingly, the surface profile of the object can be obtained by analyzing the pattern of interference light picked up by the camera 42.

Further, the above-described profile measurement apparatus 1 uses light beams of predetermined wavelengths, i.e., the first and second wavelengths $\lambda_1$ and $\lambda_2$ close to each other, contained in white light emitted by the two flash lamps 31 and 32. Therefore, concerning an interference light intensity for any selected point of the object O picked by the camera 42 while the X-Y table 21 is being moved at a predetermined speed, different intensity change patterns of interference light, which is formed by light beams of first and second wavelengths $\lambda_1$ and $\lambda_2$, are obtained with lapse of time even if the optical path difference is same, as will be described later with reference to FIG. 4.

Figure 3:
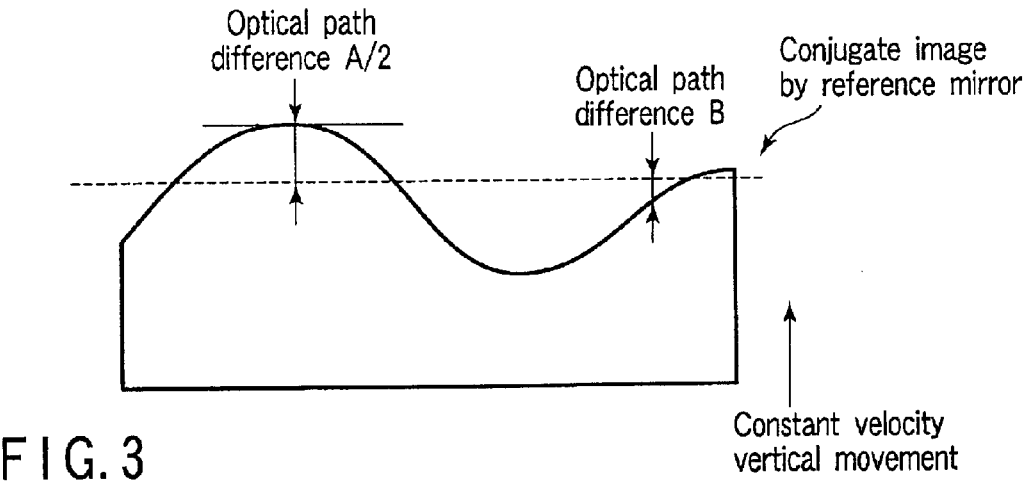
FIG. 3 is a schematic view useful in explaining that an optical-path difference is zero at different time points in different sampling points when an object is moved by vertically moving an X-Y table incorporated in the profile measurement apparatus of FIG. 1.

FIG. 3 is a schematic view useful in explaining a phenomenon detected by the profile measurement apparatus 1, in which different two points of the object O picked by the camera 42 have different optical path differences A and B (the actual height differences are A/2 and B/2, since the apparatus of FIG. 1 employs a reflection type interferometer, and the detected optical path differences are detected to be twice the respective height differences).

As shown in FIG. 3, when the X-Y table 21 has been vertically moved at a constant speed by the vertical movement mechanism 22, a conjugate image obtained by the reference mirror 52 is formed at a position (level) indicated by the broken line. On the other hand, the surface of the object O upwardly passes through the position of the conjugate image. Concerning different portions (e.g. A and B) of the object O, the surface of the object O passes a vertical position, at which the optical path difference is zero, at different time points.

Figure 4:
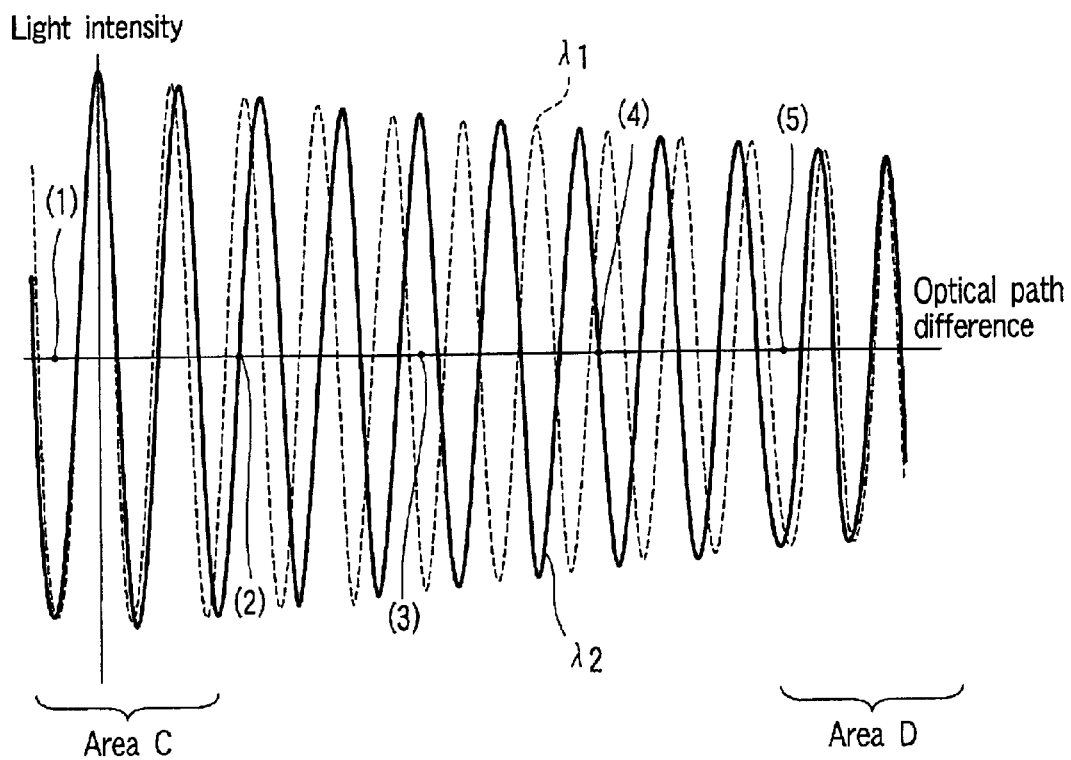
FIG. 4 is a schematic view illustrating variations in the intensity of interference light caused by variations in optical-path difference that occur when the X-Y table is vertically moved, and the timing for the camera to pick up the interference light.

FIG. 4 is a view useful in explaining the relationship between the optical path difference and light intensity shown in FIG. 3, showing envelopes of sine wave intensity variations determined from the limited coherent of interference light.

For example, the speed of the movement of the X-Y table 21 driven by the vertical movement mechanism 22, i.e., the movement speed of the vertical movement mechanism 22, is set as the phase shift corresponding to the time required for the camera 42 to pick up one set of images (images corresponding to the wavelengths $\lambda_1$ and $\lambda_2$). Specifically, it is set to $2\pi \times n$ (n is an integer not less than 1, and set at 2 in this case) $+\alpha$ ($\alpha$ falls within a range of $\pm\pi/2\pm\pi/4$).

Further, if the two flash lamps 31 and 32 are made to emit light for a predetermined interval $t_1$, e.g. 10 microsec., in synchronism with the timing for image pickup by the camera 42, the camera 42 picks up one set of images at time points corresponding to optical path differences (1), (2), (3), (4), (5). . . . As a result, the camera 42 picks up interference light images (interference patterns) of varying light intensities based on the wavelengths $\lambda_1$ and $\lambda_2$. In FIG. 4, the broken curve indicates an image based on the wavelength $\lambda_1$, and the solid curve indicates an image based on the wavelength $\lambda_2$. Since the wavelengths $\lambda_1$ is different from $\lambda_2$, an allowable range of $\pm\pi/4$ is imparted to $2\pi \times n \pm \pi/2$ serving as a phase to be changed when the camera 42 picks up one set of images.

For example, supposing that the light intensity of a j-th image is $I_j$, and the phase shift amount is $\alpha$, the phase value $\phi_j$ and amplitude (corresponding to half the changing width of a light intensity) $A_j$ of an interference pattern picked by the camera 42 are given by $$\phi_j = \arg[2i \sin \alpha (I_{j-1} - I_{j+1}) + (2I_j - I_{j+2} - I_{j-2})]$$

(i is an imaginary number term)

$$A_j = \frac{1}{2}\sqrt{4\sin^2\alpha(I_{j-1} - I_{j+1})^2 + (2I_j - I_{j+2} - I_{j-2})^2}$$

The interference pattern corresponds to a signal output from the camera 42 and to the j-th image formed by the light beams of the wavelength $\lambda_1$ and $\lambda_2$.

After that, among the images (interference patterns) formed by the light beam of the wavelength $\lambda_1$, a k-th image signal that has a maximum amplitude $\lambda_1$ is detected and a corresponding phase value $\phi_j$ is detected.

Figure 5:
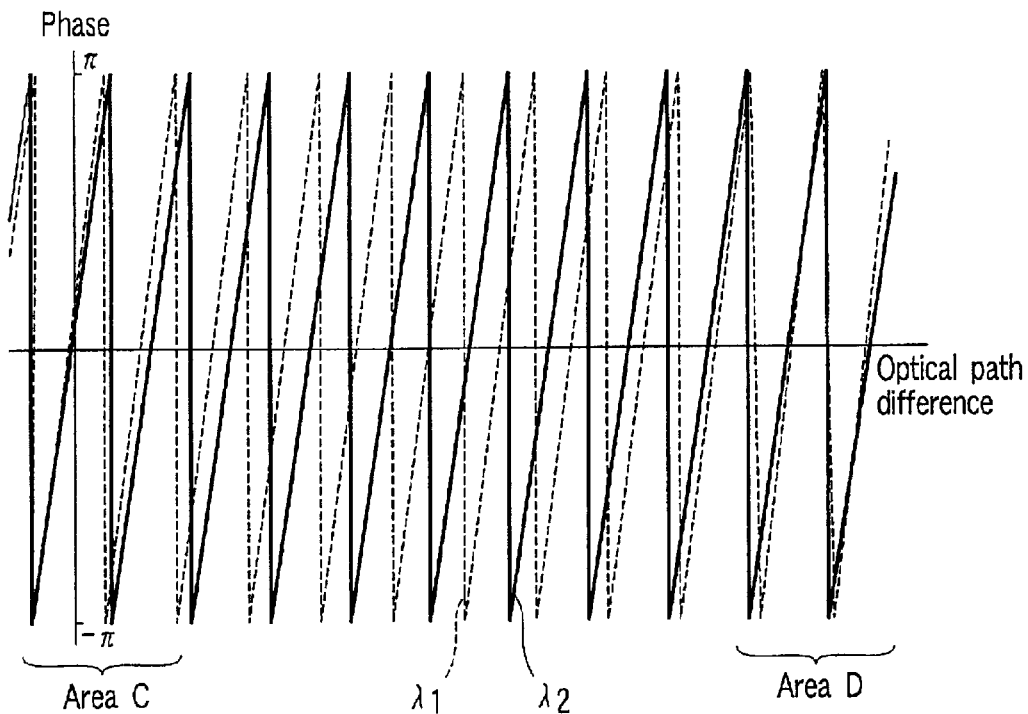
FIG. 5 is a schematic view illustrating the phase value of light of each wavelength at each optical-path difference shown in FIG. 4.

As shown in FIG. 5, the phase value $\phi_j$ ranges from $-\pi$ to $\pi$. In FIG. 5, the broken curve indicates an image based on the wavelength $\lambda_1$, while the solid curve indicates an image based on the wavelength $\lambda_2$.

As illustrated in FIG. 5, the phase value $\phi_j$ changes sharply in proportion to the optical path difference. It is evident from FIG. 5 that a number of optical path differences exist which provide a particular phase value $\phi_j$. In other words, the optical path difference cannot be determined directly from the phase value $\phi_j$. The phase difference between the phase of the light beam of the wavelength $\lambda_1$ and that of the light beam of the wavelength $\lambda_2$ changes more gently than the optical path difference. Accordingly, one optical path difference can be determined from the phase difference.

Figure 6:
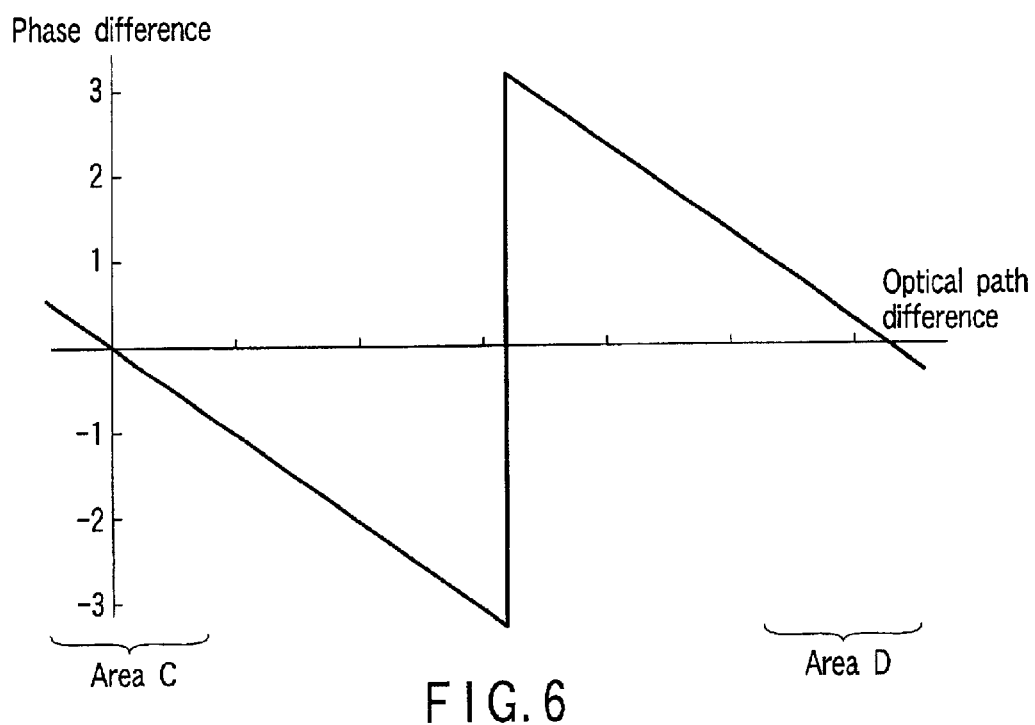
FIG. 6 is a schematic view useful in explaining the phase difference of light beams of the wavelengths at each optical-path difference shown in FIG. 4.

As shown in FIG. 6, the inclination of changes in the phase difference with respect to the optical path difference is small, and therefore if the resultant phase difference contains noise, an accurate optical path difference cannot be obtained since the inclination is small. However, the use of both the phase difference and the phase value based on the wavelength $\lambda_1$ (or $\lambda_2$) enables a more accurate optical path difference to be obtained when the k-th image has been picked up.

On the other hand, concerning the amplitude $A_j$, its accuracy is actually low. From this, it is merely understood that the optical path difference is around zero. Therefore, it is difficult to correctly determine the peak position of each envelope of FIG. 4. However, it is possible to discriminate areas (areas C and D in FIGS. 4 to 6) in which the difference in the phase values of the light beams of the wavelengths $\lambda_1$ and $\lambda_2$ is $2\pi$, and accordingly which appear to have the same phase difference.

Using the above features, the reflection surface position of each pixel can be calculated from the amount of movement of the X-Y table 21 in an image pickup cycle, an image number k, and the optical path difference assumed when the k-th image is picked up. From this calculation result, the surface profile of the object O can be obtained.

In other words, the present invention is characterized in that a series of images based on each light wavelength are extracted in the order of recording from a number of images recorded by the camera 42; the phase value of a light beam of each wavelength used to record a j-th image, and the amplitude of sine-wave type variations in an interference signal are calculated using the phase shift method; and a k-th image, in which the amplitude of the sine-wave type variations is large (i.e., the optical path difference is nearly zero), is detected for each pixel of an object picked up by the camera 42, thereby extracting the phase value of a light beam of each wavelength that forms the image.

Since the difference (phase difference) between the phase values of two light beams of different wavelengths is substantially proportional to the optical path difference as shown in FIG. 6, a rough optical path difference is calculated from the phase difference, and then a more accurate optical path difference is calculated from the calculated value and the phase value of a light beam of the wavelength $\lambda_1$ or $\lambda_2$, thereby obtaining an image number k and an accurate optical path difference assumed when a k-th image is picked up.

EXAMPLE 1

A description will now be given of measurement results obtained by measuring the profile of a certain polished surface using the profile measurement apparatus of FIG. 1. The phase shift amount employed was $4\pi - \pi/2$.

Figure 7:
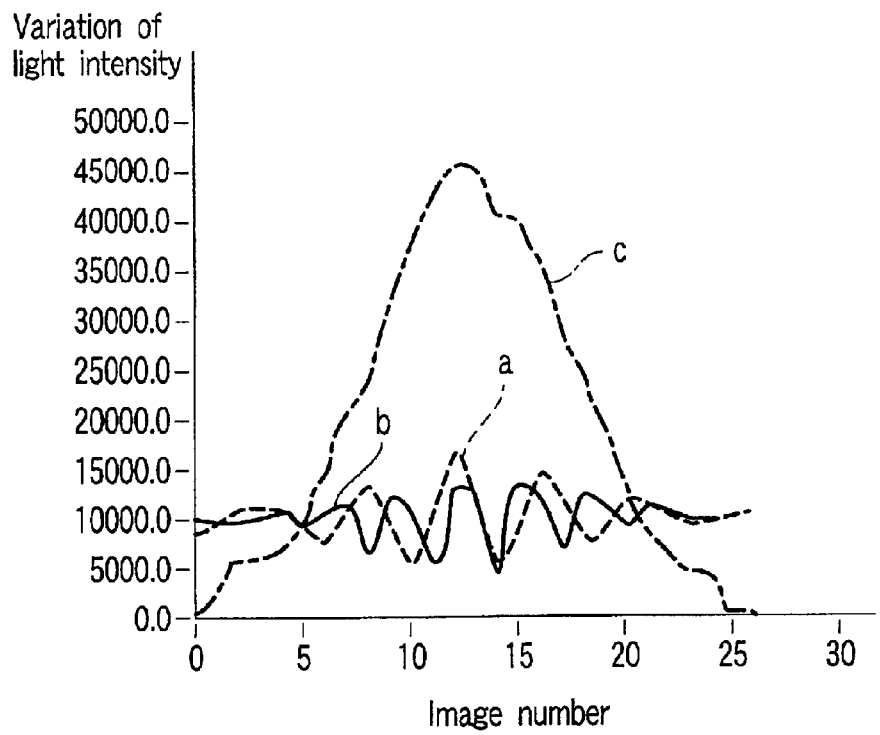
FIG. 7 is a schematic view illustrating a light intensity corresponding to an image number j for a certain pixel, and an amplitude signal (an amplitude change is obtained by summing up the amplitudes of the light beams of the wavelengths $\lambda_1$ and $\lambda_2$)

FIG. 7 shows the relationship between numbers assigned to interference images corresponding to a certain pixel picked by the camera 42, and variations in the intensity of interference light. Broken curve a indicates the intensity of light of the wavelength $\lambda_1$, while solid curve b indicates the intensity of light of the wavelength $\lambda_2$. Further, curve c of the one-dot chain line indicates variations in the amplitude $A_j$.

First, a k-th image having a maximum amplitude is obtained from FIG. 7.

Figure 8:
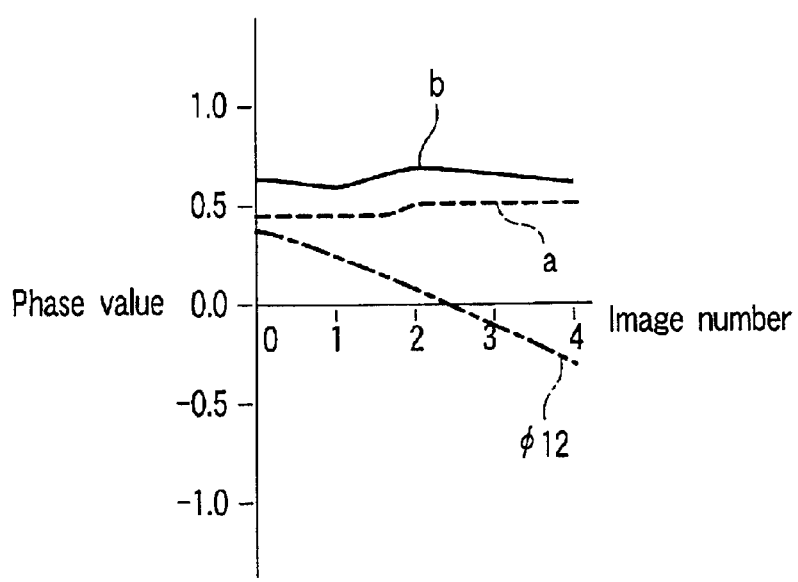
FIG. 8 is a schematic view illustrating a amount of shift (shift amount) $\alpha$ in the phase of light of each wavelength and a phase difference between light of the wavelengths, assumed before and after a k-th image, having the maximum amplitude in FIG. 7, is picked up (broken curve a indicates $\alpha/\pi$ of the light beam of the wavelength $\lambda_1$; broken curve b indicates $\alpha/\pi$ of the light beam of the wavelength $\lambda_2$; $\phi_{12}$ indicates (the phase value of the light beam of the wavelength $\lambda_1$–the phase value of the light beam of the wavelength $\lambda_2$)/$\pi$)

Subsequently, as shown in FIG. 8, a change amount a (which indicates a change in the phase value of light of the wavelength $\lambda_1$) a change amount b (which indicates a change in the phase value of light of the wavelength $\lambda_2$), and the phase difference $\phi_{12}$ (the difference between the phase values of the light of the wavelengths $\lambda_1$ and $\lambda_2$) are calculated from data concerning the k-th image having a maximum amplitude, and images located near the k-th image. The horizontal coordinate of FIG. 8 indicates the relative image number, and [2] indicates the k-th image (image with number k) obtained from FIG. 7. Accordingly, [1] of the horizontal coordinate indicates an image number k−1, and [3] an image number k+1.

It is understood from FIG. 8 that the phase shift amount $\alpha$ of the light of the wavelength $\lambda_1$ (indicated by the broken curve a) is substantially $\pi/2$ (a constant), while the phase shift amount $\alpha$ of the light of the wavelength $\lambda_2$ (indicated by the solid curve b) falls within a range of $3\pi/4 - \pi/2$.

Furthermore, it is understood from FIG. 8 that the phase difference $\phi_{12}$ considerably changes in accordance with the image number, and therefore, the optical path difference significantly changes.

Figure 9:
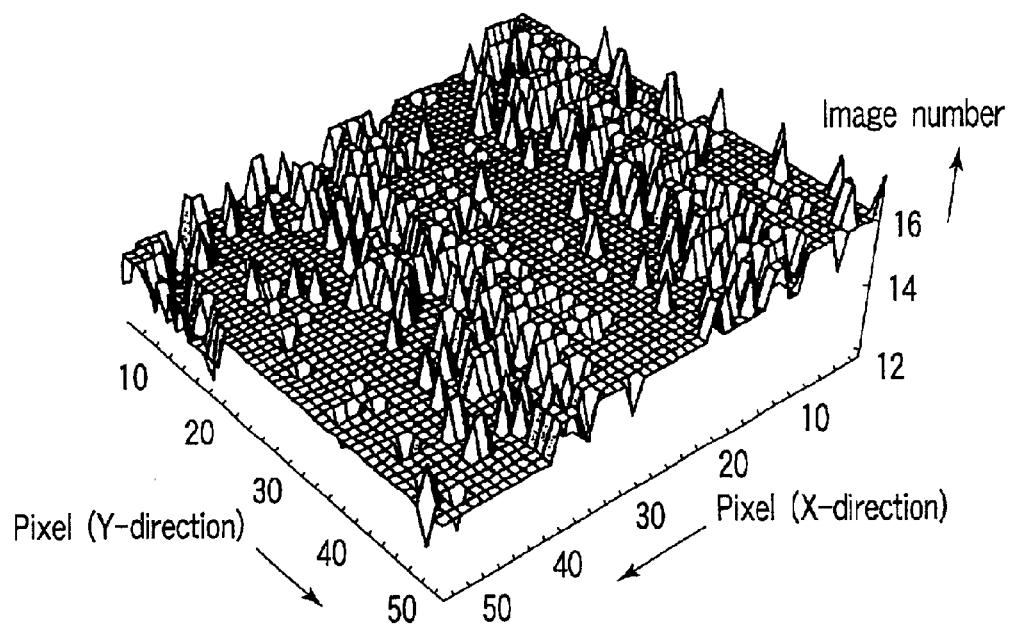
FIG. 9 is a schematic view useful in explaining a k-th image signal with a maximum amplitude calculated for each pixel.
Figure 10:
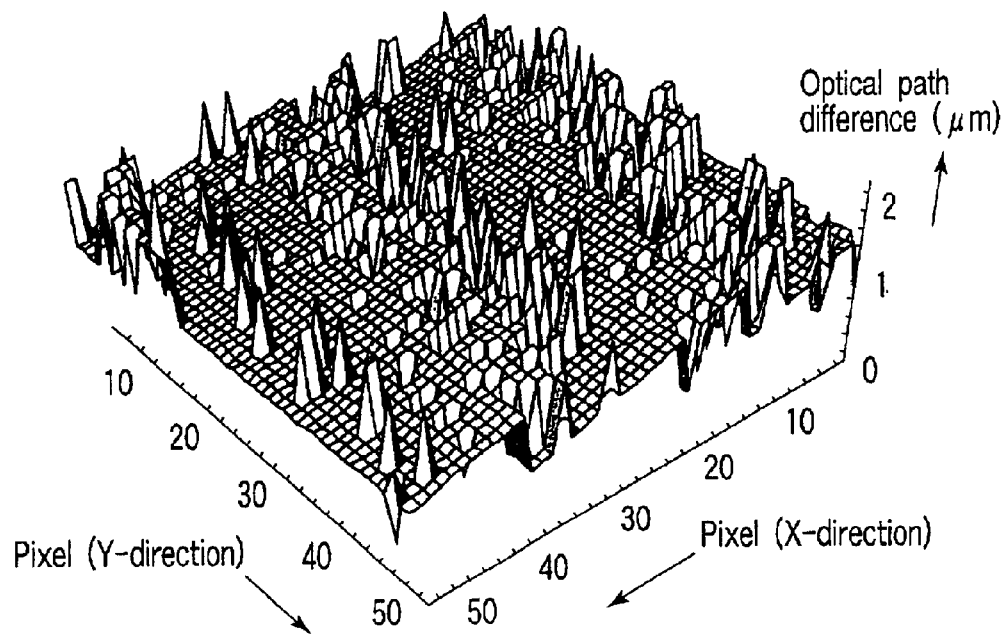
FIG. 10 is a schematic view illustrating an optical path difference assumed when the k-th image has been picked up (since the value of k varies between different pixels, discontinuous optical path differences are obtained even if a smooth surface is measured)

FIGS. 9 to 11 show a state in which light (interference light) reflected from an object O and picked up by the camera 42 is being processed, and the shape of the object O resulting from the processing.

FIG. 9 shows a k distribution of k-th image having a maximum amplitude and included in each pixel of an image picked by the camera 42. FIG. 10 shows a distribution of optical path differences (calculated values) assumed when the k-th images have been picked up.

FIG. 11 shows the profile calculated from the movement amounts of the X-Y table 21, the distribution of the k-th images shown in FIG. 9, and the optical path differences of FIG. 10. In FIG. 11, surface irregularities indicate noise contained in an image signal, which can be almost eliminated by increasing the amount of light (the energy of light of a predetermined wavelength passing through the bandpass filter) emitted from each light source (e.g. flash lamp).

As shown in FIG. 11, a three-dimensionally displayed result, which is obtained simply by combining data based on the k-values (FIG. 9) and the optical length (FIG. 10) calculated for each pixel of an image picked by the camera, is sufficiently faithful to the profile of the polished surface. From this, it is evident that the profile measuring method of the present invention can correctly measure the surface of an object O, even if the surface has a step.

For comparison, the profile of an object O obtained only using the known phase shift method is shown in FIG. 12. In the case of FIG. 12, no consideration is given to the calculation of a maximum amplitude for each pixel.

As a result, the phase values increase and decrease at a cycle of $2\pi$ in the X-direction, even if the surface of the object O is actually smooth. This discontinuity is usually eliminated by a certain process on the assumption that the to-be-measured surface is smooth, thereby providing a final profile. Accordingly, the profile of a step, if there is one, cannot be measured.

As described above, in the profile measuring method of the invention, the phase value of an interference image created by light reflected from an object and light reflected from the reference mirror is calculated using the phase shift method, in which one of the interference light paths is changed stepwise to thereby shift the phase of an interference signal. From the resultant phase value, the optical path difference between the interference light paths is calculated, to thereby obtain the surface profile of the object. In this method, the phase shift amount can be set to $2\pi \times n$ (n is an integer not less than 1) $+\alpha$ ($|\alpha|$ falls within a range of from $+\pi/2-\pi/4$ to $+\pi/2+\pi/4$). This value is up to several tens of times higher than the currently used shift amount of $\pi/2$ or $\pi/3$.

Moreover, two flash light sources are used to substantially simultaneously (with almost no time lag) emit respective light beams at an interval of a phase change, thereby providing instant illumination beams of the wavelengths $\lambda_1$ and $\lambda_2$. A two-dimensional camera is used to record, in a time series manner, the light intensity image of interference light corresponding to each wavelength, obtained at the time of phase shifting. Series of images corresponding to each wavelength are extracted in the order of recording from a number of recorded images, whereby the phase value of a light beam of each wavelength and the amplitude of sine-wave type variations in interference signal (FIG. 4), which are obtained when, for example, a j-th image contained in the extracted images has been recorded, are calculated using the phase shift method. For each pixel included in a to-be-measured area picked by the two-dimensional camera, a k-th image that has a maximum amplitude (the optical path difference is close to zero) is obtained, thereby detecting the phase value of a light beam of each wavelength forming the k-th image, and calculating an approximate optical path difference from the phase difference between the light beams of the wavelengths. From the calculated phase difference and the phase value of the light beam of the wavelength $\lambda_1$ or $\lambda_2$, a more accurate optical path difference is calculated. The acquisition of the k-th image and the accurate optical path difference assumed when the k-th image has been picked up enables the surface profile of an object to be measured with high accuracy on the basis of a plurality of interference images picked with a phase shift amount of not less than $\pi$.

In other words, the movement table is moved in units of phase shift amounts, thereby calculating a k-th image with a maximum amplitude for each pixel, and calculating an optical path difference assumed when the k-th image is picked up. Both the calculatings are repeated for all the pixels in a to-be-measured area, which enables object surface profiles to be accurately measured.

As described above, the profile measurement apparatus of the invention can measure the surface profile of an object, which includes fine irregularities, at a speed up to several tens of times the conventional speed, while maintaining a fine resolving power. Further, it can provide a wide measurement range that cannot be realized by the known phase shift method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A profile measuring method of calculating, using a phase shift method, a phase value of an interference image formed by a light beam reflected from an object and a light beam reflected from a reference mirror, thereby obtaining an optical path difference from the calculated phase value and obtaining a profile of the object from the optical path difference, comprising:

emitting, to the object, two flash light beams, having wavelengths slightly different from each other, with a predetermined interval $t_1$ therebetween; and picking up, using a camera, interference light formed by light beams reflected from the object and a light beam reflected from the reference mirror, while moving the object in a direction, in which the two flash light beams are directed, in units of intervals $t_2$ at which each of the two flash light beams is cyclically emitted, a phase shift amount corresponding to a movement amount of the object at a time being set to a value falling within a range of $2n\pi \pm \pi/2 \pm \pi/4$, n being an integer not less than 1.

2. A profile measuring method according to claim 1, wherein the two flash light beams are light beams of predetermined wavelengths obtained by passing white light emitted from flash lamps through band-pass filters.

3. A profile measuring method according to claim 1, wherein the camera has a high-speed double exposure function.

4. A profile measurement apparatus comprising:

a first flash light source which emits a flash light beam of a first wavelength;

a second flash light source which emits a flash light beam of a second wavelength, different from the first wavelength, with an interval $t_1$ from the light beam of the first wavelength;

a movement table which moves an object in a direction in which the flash light beams from the first and second flash light sources are directed to the object;

a translucent mirror which diverges, to a reference mirror, part of the two flash light beams emitted from the first and second flash light sources and directed to the object, the translucent mirror returning, to an original route, light reflected from the reference mirror;

a camera which picks up, as an image, interference light formed by light reflected from the object and light reflected from the reference mirror;

a table control section which moves the movement table by a predetermined distance in synchronism with an interval $t_2$ between successive emissions of light from the first and second flash light sources; and an image processing unit which selects an image signal with a maximum amplitude from a plurality of images output from the camera when the movement table has been moved by the predetermined distance in synchronism with the interval $t_2$, thereby determining an optical path difference on the basis of a phase difference between two interference images created by the two flash light beams emitted from the first and second flash light sources when the camera has picked up the image signal with the maximum amplitude, and also on the basis of phase values of the interference images assumed when the camera has picked up the image signal with the maximum amplitude.

5. A profile measurement apparatus according to claim 4, wherein the first and second flash light sources emit light beams of predetermined wavelengths obtained by passing white light emitted from flash lamps through band-pass filters.

6. A profile measurement apparatus according to claim 4, wherein the camera has a high-speed double exposure function for individually picking up two interference images formed by two light beams of different wavelengths emitted with a slight interval of 1 msec.

7. A profile measurement apparatus according to claim 4, wherein the camera has a high-speed double exposure function for individually picking up two interference images formed by two light beams of different wavelengths emitted with a slight interval of 200 nsec. to 50 microsec.

8. A profile measurement apparatus according to claim 4, wherein the camera has a high-speed double exposure function for individually picking up two interference images formed by two light beams of different wavelengths emitted with a slight interval of 10 microsec.

9. A profile measurement apparatus according to claim 4, wherein the movement table is moved in synchronism with the interval $t_2$ between successive emissions of light from the first and second flash light sources, in a direction in which the two flash light beams are directed, such that the movement table can provide a phase shift amount falling within a range of $2n\pi\pm\pi/2\pm\pi/4$, n being an integer not less than 1.

10. A profile measurement apparatus comprising:

a first flash light source which emits a flash light beam of a first wavelength;

a second flash light source which emits a flash light beam of a second wavelength, different from the first wavelength, with an interval $t_1$ from the light beam of the first wavelength;

a movement table which moves an object in a direction in which the flash light beams from the first and second flash light sources are directed to the object;

a translucent mirror which diverges, to a reference mirror, part of the two flash light beams emitted from the first and second flash light sources and directed to the object, the translucent mirror returning, to an original optical path, light reflected from the reference mirror;

a camera which picks up, as an image, interference light formed by light reflected from the object and light reflected from the reference mirror;

a table control section which moves the movement table by a predetermined distance in synchronism with an interval $t_2$ between successive emissions of light from the first and second flash light sources; and an image processing unit which selects an image with a maximum amplitude from a plurality of images output from the camera each time the first and second flash light sources emit their respective light beams with the interval $t_1$ interposed therebetween, and also each time the movement table is moved by the predetermined distance in synchronism with the interval $t_2$, the image processing unit then calculating an optical path difference from two interference images formed by the two light beams emitted from the first and second flash light sources and reflected from a surface of the object, the image processing unit calculating respective optical path differences at the points, thereby determining a surface profile of the object on the basis of phase values of the two flash light beams emitted from the first and second flash light sources when the camera has picked up an image signal with a maximum amplitude from the output images at each of the points of the to-be-measured area of the object.

11. A profile measurement apparatus according to claim 10, wherein the first and second flash light sources emit light beams of predetermined wavelengths obtained by passing white light emitted from flash lamps through band-pass filters.

12. A profile measurement apparatus according to claim 10, wherein the camera has a high-speed double exposure function for individually picking up two interference images formed by two light beams of different wavelengths emitted with a slight interval of 1 msec.

13. A profile measurement apparatus according to claim 10, wherein the camera has a high-speed double exposure function for individually picking up two interference images formed by two light beams of different wavelengths emitted with a slight interval of 200 nsec. to 50 microsec.

14. A profile measurement apparatus according to claim 10, wherein the camera has a high-speed double exposure function for individually picking up two interference images formed by two light beams of different wavelengths emitted with a slight interval of 10 microsec.

15. A profile measurement apparatus according to claim 10, wherein the movement table is moved in synchronism with the interval $t_2$ between successive emissions of light from the first and second flash light sources, in a direction in which the two flash light beams are directed, such that the movement table can provide a phase shift amount falling within a range of $2n\pi\pm\pi/2\pm\pi/4$, n being an integer not less than 1.

* * * * *